(12) United States Patent
Andersen

(10) Patent No.: US 7,040,089 B2
(45) Date of Patent: May 9, 2006

(54) WAVE-POWERED GENERATOR DEVICE

(75) Inventor: Egil Andersen, Haugesund (NO)

(73) Assignee: Wave Energy AS, (NO)

( * ) Notice: Subject to any disclaimer, the term of this patent is extended or adjusted under 35 U.S.C. 154(b) by 30 days.

(21) Appl. No.: 10/478,162

(22) PCT Filed: Jan. 31, 2002

(86) PCT No.: PCT/NO02/00040

§ 371 (c)(1),
(2), (4) Date: Nov. 18, 2003

(87) PCT Pub. No.: WO02/066829

PCT Pub. Date: Aug. 29, 2002

(65) Prior Publication Data

US 2004/0163384 A1    Aug. 26, 2004

(30) Foreign Application Priority Data

Feb. 9, 2001    (NO) .................................. 20010673

(51) Int. Cl.
*F16D 31/02*    (2006.01)
(52) U.S. Cl. ....................................................... 60/398
(58) Field of Classification Search .................. 290/42, 290/53; 60/398
See application file for complete search history.

(56) References Cited

U.S. PATENT DOCUMENTS

| 3,983,404 A | * | 9/1976 | Sherrard .................... 290/53 |
| 4,263,516 A | | 4/1981 | Papadakis .................... 60/398 |
| 4,296,602 A | | 10/1981 | Hales et al. .................. 60/398 |

FOREIGN PATENT DOCUMENTS

| FR | 1174108 | * | 3/1959 |
| GB | 1520006 | | 8/1978 |
| NO | 156219 | | 8/1987 |
| NO | 174597 | | 6/1994 |
| SE | 420941 | | 11/1981 |
| WO | 00/71892 | | 11/2000 |

* cited by examiner

*Primary Examiner*—F. Daniel Lopez
(74) *Attorney, Agent, or Firm*—Andrus, Sceales, Starke & Sawall, LLP

(57) ABSTRACT

A wave power station device (1) of the kind wherein the waves flow up a ramp (12) and wherein the ramp (12) is provided with fixed openings (17), the openings (17) being arranged in such a way that water flowing up the ramp (12) will flow down through the openings (17) to an insignificant degree, whereas water flowing down the ramp (12) will essentially flow down through the openings (17).

10 Claims, 4 Drawing Sheets

WAVE-POWERED GENERATOR DEVICE

CROSS REFERENCE TO RELATED APPLICATION

The present application is the U.S. national stage application of International Application PCT/NO02/00040, filed Jan. 31, 2002, which international application was published on Aug. 29, 2002 as International Publication WO 02/066829. The International Application claims priority of Norwegian Patent Application 20010673, filed Feb. 9, 2001.

FIELD OF THE INVENTION

This invention relates to a wave power station, in which there are arranged, at several levels, reservoirs which the water of the waves flows into. The water flows on through low-pressure turbines arranged typically for the production of electrical power.

BACKGROUND OF THE INVENTION

Ocean waves occur through conversion of part of the wind energy across ocean areas. The wave energy calculated per surface area is essentially greater than the solar and wind energy in the same area. Utilization of wave energy from the ocean therefore constitutes an almost inexhaustible, renewable source of energy, and it is the only pure energy source which may potentially replace today's consumption of fossil fuels.

On the basis of the above-mentioned conditions, solutions for the utilization wave power have been proposed over the last decades. Large-scale and full scale wave power stations have also been built in many embodiments, without any of the projects having provided the desired result.

A wave power station based on the wedge chute principle stand out as a simple and reliable plant. Simplified the system may be explained as the incoming waves being forced inwards between the two cuneiform side edges, whereby the maximum height of the waves increases. At the narrowest end portion of the wedge, at a level above the sea surface is arranged a collecting basin. Wave crests exceeding this level, flow over the edge of the basin and fill the basin. The drop of the water between the collecting basin and sea level is utilized in a conventional manner by means of a low-pressure turbine.

The reason why wave power stations of this kind are not used to a great degree is, i.a., that a relatively small efficiency is achieved in practice. One of the reasons for this is that if a wave comes in, which does not reach all the way up to the edge of the basin, the water of this wave will return within the wedge, in which it may possibly break an entering wave which would be large enough to reach into the basin. Another reason is that when a really big wave comes, considerably exceeding the height of the basin, part of the energy of the wave will not be utilized because the water will drop to the relatively low predetermined basin height. The two conditions mentioned contribute to the fact that wave power stations based on the wedge chute principle have an efficiency in the order of 15%.

It has turned out to be difficult to size wave power stations according to other known technique so that they have sufficient strength to withstand the forces arising in an environment of the kind in question.

SUMMARY OF THE INVENTION

The invention has as its object to remedy the drawbacks of known technique.

The object is achieved, according to the invention, through the features set forth in the description below and in the following claims.

A wave power station according to the invention utilizes the kinetic energy of a wave by lifting it as high as possible up a ramp. The ramp is divided into segments by means of vertical walls and provided with through openings which may guide the wave water down into one of several reservoirs located one above the other. The openings in the bottom of the ramp is of such configuration with respect to direction and size, that water flowing up the ramp will flow across the openings, whereas water flowing down the ramp will run down through the nearest opening and down into the corresponding reservoir. From each reservoir the water flows through a turbine located below and back to sea level.

The wave power station may be of such configuration that it is suitable for example for fixed installation along a beach, built into a pier arrangement or for fixed/floating installation in open waters.

In an appropriate embodiment for fixed or floating positioning in the open sea, the power station is configured as a relatively flat truncated cone. The conical cone surface forms the ramp mentioned above. Projecting up from the cone surface a number of walls radiate radially outwards from the top of the cone. The walls may extend further out than to the outer periphery of the cone. Two adjacent walls, which are spaced further apart at the foot of the cone than at its top because of the geometry of the cone, form together with the intermediate cone surface a cuneiform chute. The bottom of each cuneiform chute is provided with a number of openings communicating with one of the basins preferably located on the same level in the interior of the cone. Necessary pipe connections, turbines and other machinery may be positioned in a central part which extends from the top of the cone down to the sea level.

In such an embodiment at least one of the wedge chutes of the wave power station will be arranged to receive waves moving towards the power station from any direction.

BRIEF DESCRIPTION OF THE DRAWINGS

In the following is described a non-limiting example of a preferred embodiment which is visualized in the accompanying drawings, in which.

DETAILED DESCRIPTION OF THE INVENTION

Figure 1:
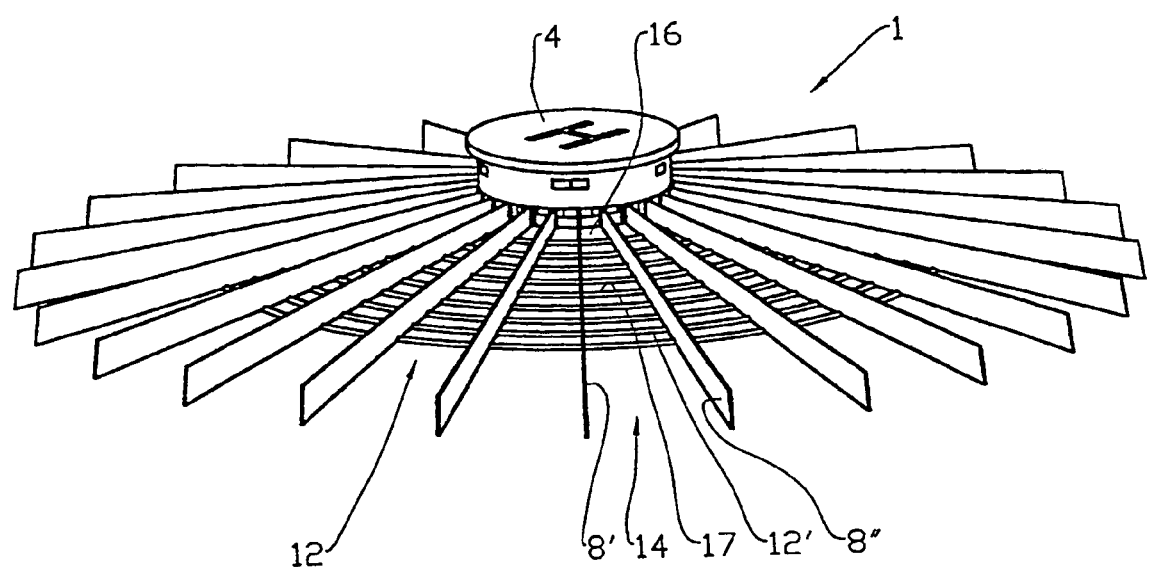
FIG. 1 shows in perspective a floating wave power station according to the invention.

In the drawings the reference numeral 1 identifies a wave power station, in which the external geometry of the power station is essentially constituted by a truncated cone 2 which may be floating on the sea surface 3 or fixedly mounted to the sea bed. An operating/control room 4 may be placed above the top of the cone 2 and serve at the same time as access and roof for a machine room 6 underneath. The lower portion of the cone 2 is provided with buoyancy tanks 9.

Figure 2:
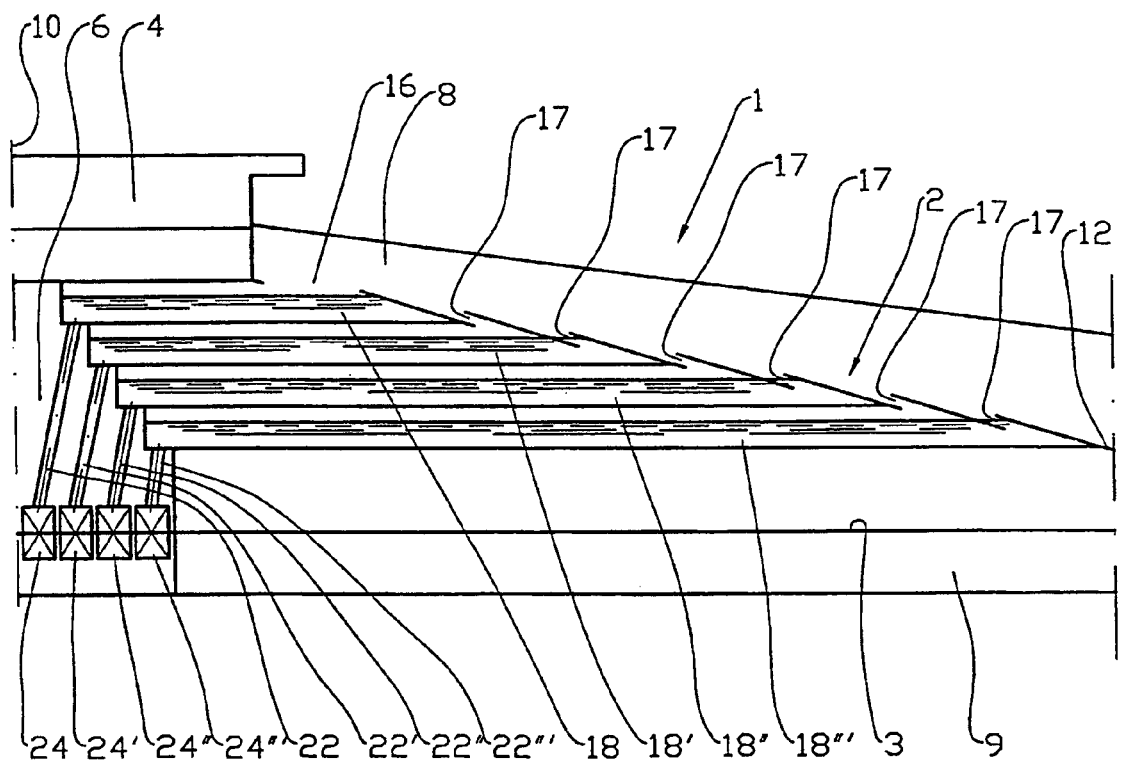
FIG. 2 shows a schematic vertical section of the wave power is station according to FIG. 1, from the centre line of the power station radially outwards.

Several vertical walls 8 radiating radially from the vertical centre axis 10 of the cone 2 project up from the conical surface 12 of the cone 2. Two adjacent walls 8' and 8" form, together with the intermediate cone sector/ramp 12' a cuneiform chute 14. Like the other cone sectors/ramps the cone sector/ramp 12' is provided with a through opening 16 at the very top, and several directional openings 17 located below. Each of the openings 16 and 17 communicates with one of the reservoirs 18, 18', 18" and 18''' positioned one above the other inside the cone. In FIG. 2 are shown four reservoir levels. The number must be adjusted according to the dimensions of the power station and the existing wave sizes and frequencies. The directional openings 17 are directed towards the highest end portion of the ramp 12' of the wave power station, and sloping gently inwards in a preferred embodiment.

Pipe connections 22, 22', 22" and 22''' connect a respective one of the reservoirs 18, 18', 18" and 18''' to their respective low-pressure turbines 24, 24', 24" and 24'''.

When a wave rolls in towards the wave power station 1, it is directed into one or more of the wedge chutes 14'. The water from the wave flows up the cone sector/ramp 12' until it reaches its highest level, where part of the water flows through the opening 16 down into the reservoir 18. As the rest of the wave recedes, the water flows down through the most adjacent ones of the openings 17 into their corresponding reservoirs 18' to 18'''.

The essential part of the wave water flowing up a wedge chute, enters one of the reservoirs 18 to 18'''. Only an insignificant amount of water flows back and disturb other incoming waves.

Water from the reservoirs 18 to 18''' flows on through the respective pipe connections 22 to 22''' to the turbines 24 to 24'''.

Figure 3:
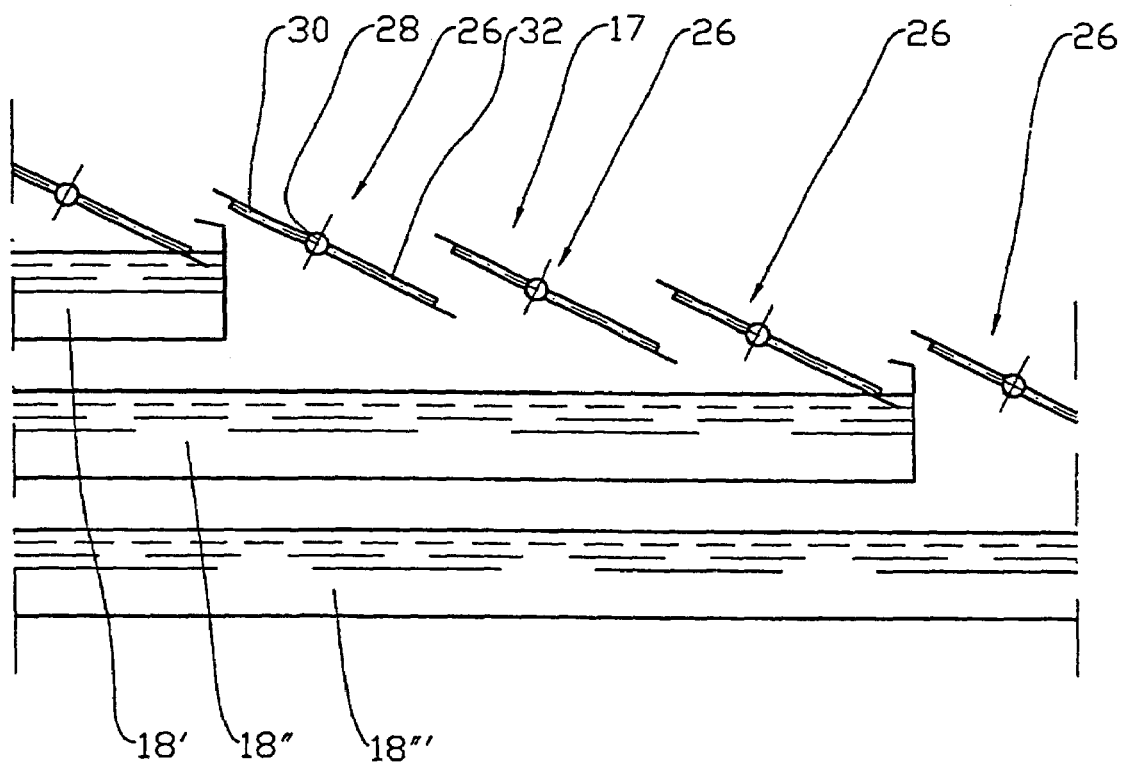
FIG. 3 shows a schematic vertical section like that in FIG. 2 on a larger scale in an embodiment in which the through openings are provided with dampers.
Figure 4:
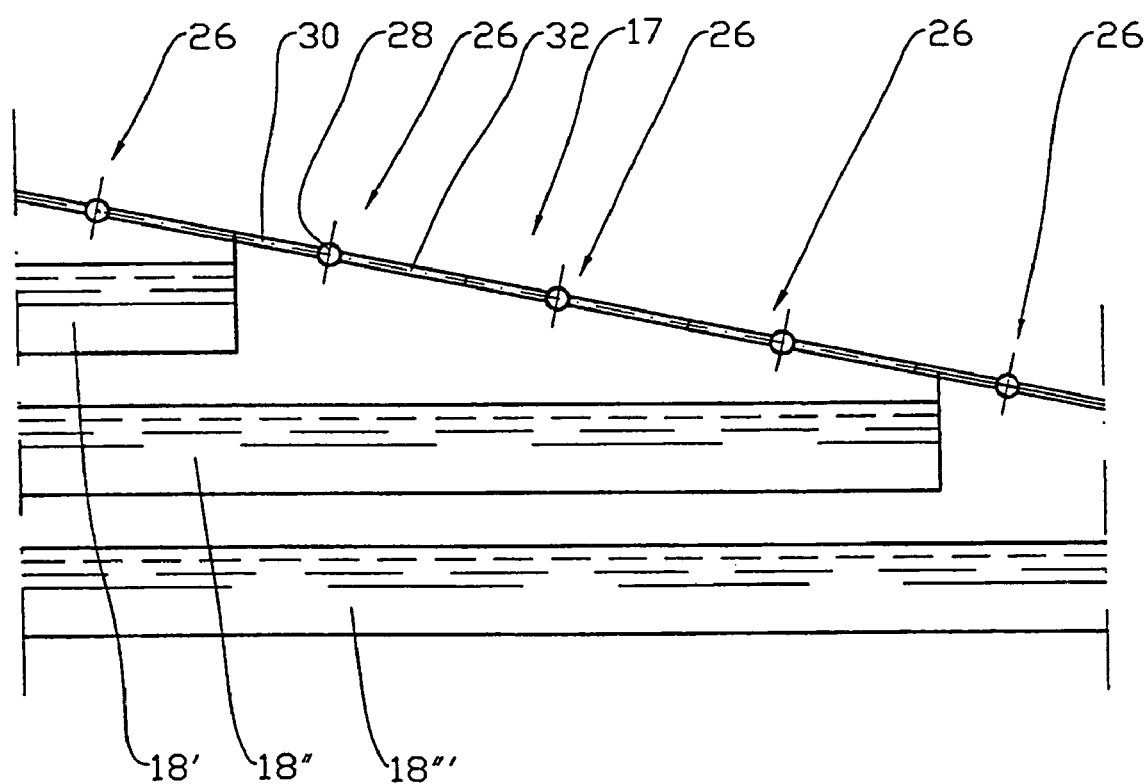
FIG. 4 shows a schematic vertical section like that in FIG. 3, but here the dampers are closed.

In an alternative embodiment, see FIGS. 3 and 4, the openings 17 are provided with one or more butterfly dampers 26 hinging on hinge axles 28. The area of the upper portion 30 of the damper 26, located above the hinge axle 28, is smaller than the area of the lower portion 32 of the damper 26, located below the hinge axle 28. The dampers 26 are arranged to be closed in that the entering wave forces the upper portion 30 of the damper down. When the wave stops, the water pressure against the larger area 32 makes the damper turn into the open position.

According to most principles used in known wave power stations, the wave water must be utilized in the turbine immediately because no reservoir is installed. Thus it is necessary to size such power stations so as to provide an acceptable efficiency over a very wide capacity and pressure range, which results in complicated solutions and dissatisfactory overall efficiency. In wave power stations according to the invention the turbines may be sized for a fixed drop, by which higher efficiency is achieved by means of a relatively simple turbine.

The invention claimed is:

1. A wave power station comprising:
   a ramp arranged to receive a wave such that the wave flows up the ramp;
   a plurality of storage reservoirs positioned below the ramp and extending at different respective heights;
   a plurality of openings formed in the ramp, each storage reservoir in communication with at least one of the openings;
   wherein each opening is arranged such that an insignificant amount of water flowing up the ramp will flow down through the opening, whereas water flowing down the ramp will essentially flow down through the opening and into a respective storage reservoir;
   wherein the storage reservoirs extend substantially horizontally.

2. The wave power station of claim 1 wherein each opening is defined by overlapping end portions of sections of the ramp.

3. The wave power station of claim 1, wherein the storage reservoirs are located in the interior of the wave power station.

4. The wave power station of claim 1, wherein the storage reservoirs each communicate with at least one of a plurality of respective turbines.

5. The wave power station of claim 4, wherein
   each of the turbines are arranged to receive water stored in a respective storage reservoir such that the greater the height of the reservoir storing the water, the greater the power generated by the respective turbine.

6. A wave power station comprising:
   a ramp arranged to receive a wave such that the wave flows up the ramp;
   a plurality of storage reservoirs positioned below the ramp and extending at different respective heights;
   a plurality of openings formed in the ramp, each storage reservoir in communication with at least one of the openings;
   wherein each opening is arranged such that an insignificant amount of water flowing up the ramp will flow down through the opening, whereas water flowing down the ramp will essentially flow down through the opening and into a respective storage reservoir;
   wherein the ramp is cone-shaped.

7. A wave power station comprising:
   a ramp arranged to receive a wave such that the wave flows up the ramp;
   a plurality of storage reservoirs positioned below the ramp and extending at different respective heights;
   a plurality of openings formed in the ramp, each storage reservoir in communication with at least one of the openings;
   wherein each opening is arranged such that an insignificant amount of water flowing up the ramp will flow down through the opening, whereas water flowing down the ramp will essentially flow down through the opening and into a respective storage reservoir;
   wherein the openings are provided with closing devices, in which less than half the area of each closing device is located above a hinge axis.

8. A wave power station comprising:
   a ramp arranged to receive a wave such that the wave flows up the ramp;
   a plurality of reservoirs extending at different respective heights; and
   a plurality of openings formed in the ramp, each reservoir in communication with at least one of the openings;
   wherein the openings are provided with closing devices, in which less than half the area of each closing device is located above a hinge axis.

9. The wave power station of claim 8, wherein the reservoirs extend substantially horizontally.

10. The wave power station of claim 8, wherein the storage reservoirs are located in the interior of the wave power station.

* * * * *